US012615112B2

(12) United States Patent
Yang et al.

(10) Patent No.: US 12,615,112 B2
(45) Date of Patent: Apr. 28, 2026

(54) RADIO-UNLICENSED (NR-U) VIRTUAL COMPONENT CARRIER (CC) FOR IMPROVED LINK BUDGET

(71) Applicant: QUALCOMM Incorporated, San Diego, CA (US)

(72) Inventors: Luanxia Yang, Beijing (CN); Changlong Xu, Beijing (CN); Jing Sun, San Diego, CA (US); Xiaoxia Zhang, San Diego, CA (US); Hao Xu, Beijing (CN)

(73) Assignee: Qualcomm Incorporated, San Diego, CA (US)

( * ) Notice: Subject to any disclaimer, the term of this patent is extended or adjusted under 35 U.S.C. 154(b) by 611 days.

(21) Appl. No.: 17/917,901

(22) PCT Filed: Jul. 1, 2020

(86) PCT No.: PCT/CN2020/099724
§ 371 (c)(1),
(2) Date: Oct. 7, 2022

(87) PCT Pub. No.: WO2022/000368
PCT Pub. Date: Jan. 6, 2022

(65) Prior Publication Data
US 2023/0198690 A1     Jun. 22, 2023

(51) Int. Cl.
*H04L 5/00* (2006.01)
*H04W 72/0453* (2023.01)
(52) U.S. Cl.
CPC ............ *H04L 5/001* (2013.01); *H04L 5/0044* (2013.01); *H04L 5/0053* (2013.01); *H04W 72/0453* (2013.01)

(58) Field of Classification Search
CPC ..... H04L 5/001; H04L 5/0044; H04L 5/0053; H04W 72/0453
(Continued)

(56) References Cited

U.S. PATENT DOCUMENTS

| | | |
|---|---|---|
| 10,693,621 B2 | 6/2020 | Bendlin et al. |
| 11,019,610 B2 | 5/2021 | Li et al. |

(Continued)

FOREIGN PATENT DOCUMENTS

| | | |
|---|---|---|
| WO | 2019051304 A1 | 3/2019 |

OTHER PUBLICATIONS

International Search Report and Written Opinion—PCT/CN2020/099724—ISA/EPO—Mar. 31, 2021.
(Continued)

*Primary Examiner* — Nicholas R Taylor
*Assistant Examiner* — Chong G Kim
(74) *Attorney, Agent, or Firm* — Seyfarth Shaw LLP

(57) ABSTRACT

A method for wireless communication performed by a wireless device includes aggregating a number of component carriers (CCs) to generate a virtual CC. The method also includes allocating data channel resources in the virtual CC based on a virtual bandwidth part (BWP) and allocating control channel resources in the virtual CC based on the virtual BWP. The method further includes communicating on a data channel based on the allocated data channel resources and communicating on a control channel based on the allocated control channel resources.

29 Claims, 8 Drawing Sheets

(58) Field of Classification Search
USPC ......................................................... 370/329
See application file for complete search history.

(56) References Cited

U.S. PATENT DOCUMENTS

| | | | | |
|---|---|---|---|---|
| 12,206,603 B2 * | 1/2025 | He | ........................... | H04L 5/001 |
| 2014/0119313 A1 * | 5/2014 | Yang | .................... | H04L 5/0053 |
| | | | | 370/329 |
| 2020/0112959 A1 | 4/2020 | Gong et al. | | |
| 2020/0374915 A1 * | 11/2020 | Tie | .................... | H04W 52/0216 |
| 2021/0084653 A1 * | 3/2021 | Li | ........................... | H04L 5/001 |
| 2022/0376847 A1 * | 11/2022 | He | .................... | H04W 72/0453 |
| 2023/0018496 A1 * | 1/2023 | Cui | .................... | H04W 72/0453 |
| 2024/0214135 A1 * | 6/2024 | Yoshioka | ................ | H04L 5/001 |

OTHER PUBLICATIONS

Nokia: et al., "On Remaining Details of BWPs", 3GPP TSG-RAN WG1 Meeting #93, R1-1806143, May 25, 2018 (May 25, 2018), 6 Pages, the whole document.
Nokia: et al., "On the Alignment of DCI Format Sizes", 3GPP TSG RAN WG1 Meeting #92bis, R1-1804614, Apr. 20, 2018 (Apr. 20, 2018), 5 Pages, the whole document.
Nokia, et al., "On PDCCH Enhancements for NR URLLC", 3GPP Draft, 3GPP TSG RAN WG1#99, R1-1912511, 3rd Generation Partnership Project (3GPP), Mobile Competence Centre, 650, Route Des Lucioles, F-06921, Sophia-Antipolis Cedex, France, vol. RAN WG1, No. Reno, NV, USA, Nov. 18, 2019-Nov. 22, 2019, Nov. 9, 2019 (Nov. 9, 2019), XP051823451, 23 pages, section 3.1.2, section 2.1.2.

* cited by examiner

| Device Class | Operating bands | Maximum EIRP | Maximum EIRP PSD |
|---|---|---|---|
| Standard-Power Access Point (AFC Controlled) | U-NII-5 (5.925-6.425 GHz) U-NII-7 (6.525-6.875 GHz) | 36 dBm | 23 dBm/MHz |
| Client Connected to Standard-Power Access Point | | 30 dBm | 17 dBm/MHz |
| Low-Power Access Point (Indoor only) | U-NII-5 (5.925-6.425 GHz) U-NII-6 (6.425-6.525 GHz) U-NII-7 (6.525-6.875 GHz) U-NII-8 (6.875-7.125 GHz) | 30 dBm | 5 dBm/MHz |
| Client Connected to Low-Power Access Point | | 24 dBm | -1 dBm/MHz |
| Very Low Power Device | U-NII-5 (5.925-6.425 GHz) U-NII-6 (6.425-6.525 GHz) U-NII-7 (6.525-6.875 GHz) U-NII-8 (6.875-7.125 GHz) | 4dBm~14dBm (For a 160MHz channel) | -18 dBm/MHz~-8dBm/MHz |

*FIG. 3*

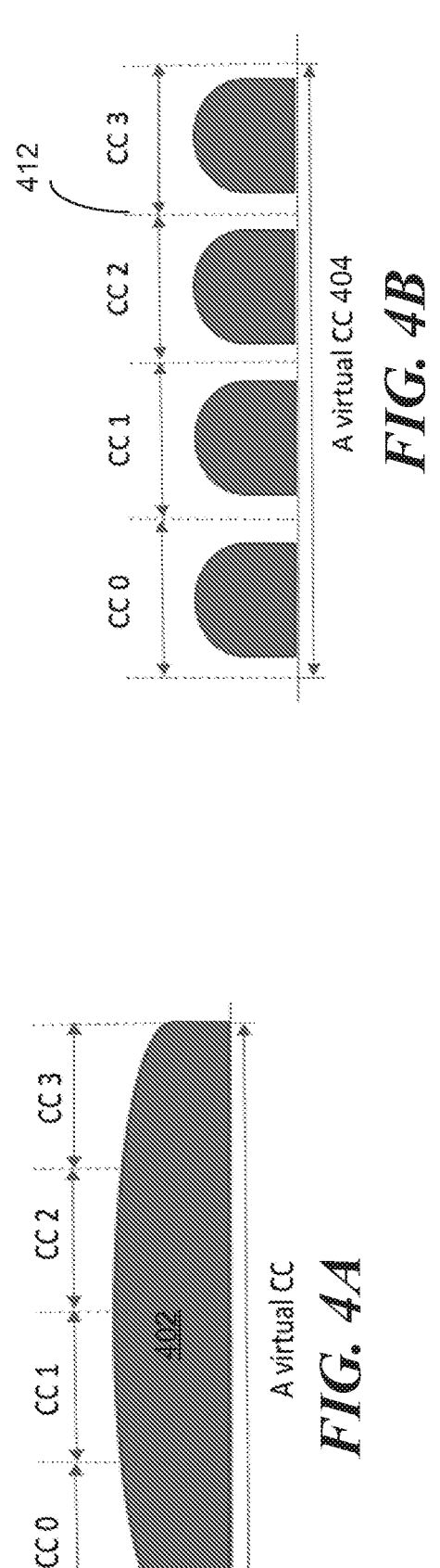
CC 0   CC 1   CC 2   CC 3
A virtual CC   402
*FIG. 4A*
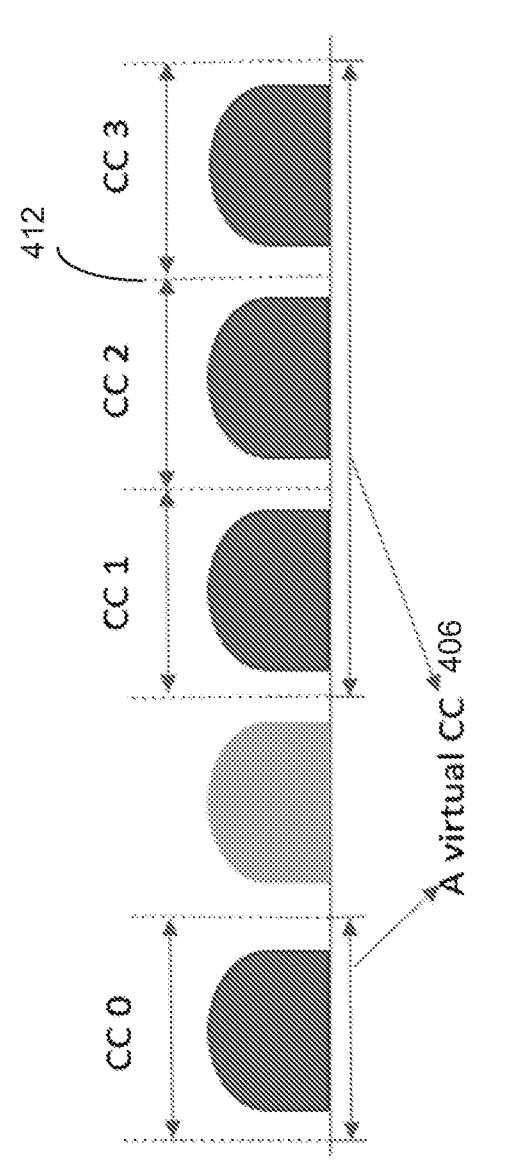
412
CC 0   CC 1   CC 2   CC 3
A virtual CC   404
*FIG. 4B*
412
CC 0   CC 1   CC 2   CC 3
A virtual CC   406
*FIG. 4C*

$k_1 = \lceil N_1/P \rceil$    $k_2 = \lceil N_2/P \rceil$    $k_3 = \lceil N_3/P \rceil$    $k_4 = \lceil N_4/P \rceil$ $N_1$: the number of PRBs in CC 0

$N_2$: the total number of PRBs in CC 0 and 1

$N_3$: the number of PRBs in CC 0, 1 and 2

$N_4$: the number of PRBs in all CCs

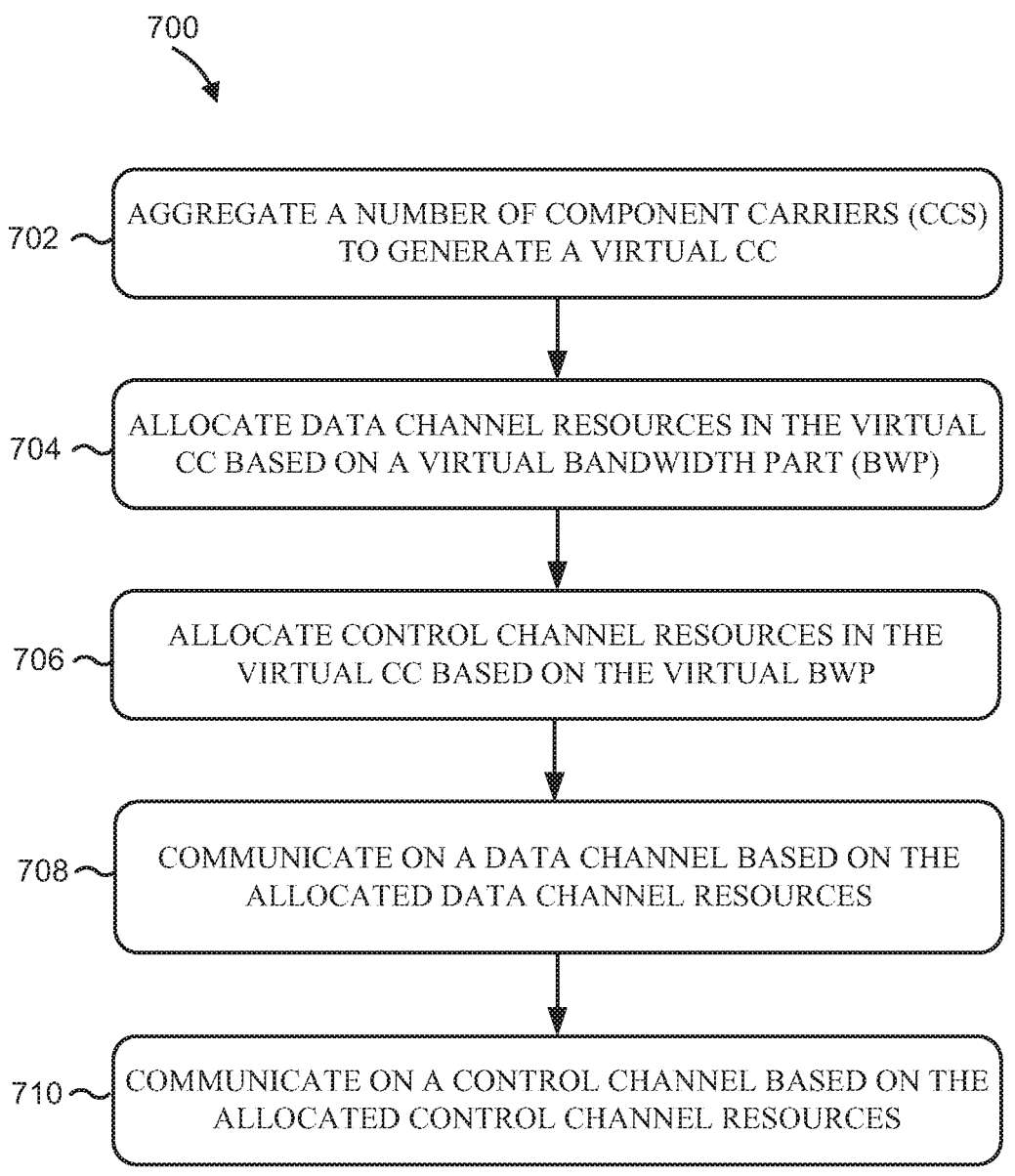

700

702 — AGGREGATE A NUMBER OF COMPONENT CARRIERS (CCS) TO GENERATE A VIRTUAL CC

704 — ALLOCATE DATA CHANNEL RESOURCES IN THE VIRTUAL CC BASED ON A VIRTUAL BANDWIDTH PART (BWP)

706 — ALLOCATE CONTROL CHANNEL RESOURCES IN THE VIRTUAL CC BASED ON THE VIRTUAL BWP

708 — COMMUNICATE ON A DATA CHANNEL BASED ON THE ALLOCATED DATA CHANNEL RESOURCES

710 — COMMUNICATE ON A CONTROL CHANNEL BASED ON THE ALLOCATED CONTROL CHANNEL RESOURCES

*FIG. 7*

RADIO-UNLICENSED (NR-U) VIRTUAL COMPONENT CARRIER (CC) FOR IMPROVED LINK BUDGET

FIELD OF THE DISCLOSURE

Aspects of the present disclosure generally relate to wireless communications, and more particularly to techniques and apparatuses for new radio-unlicensed (NR-U) virtual component carriers (CCs).

BACKGROUND

Wireless communications systems are widely deployed to provide various telecommunications services such as telephony, video, data, messaging, and broadcasts. Typical wireless communications systems may employ multiple-access technologies capable of supporting communications with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and long term evolution (LTE). LTE/LTE-Advanced is a set of enhancements to the universal mobile telecommunications system (UMTS) mobile standard promulgated by the Third Generation Partnership Project (3GPP).

A wireless communications network may include a number of base stations (BSs) that can support communications for a number of user equipment (UEs). A user equipment (UE) may communicate with a base station (BS) via the downlink and uplink. The downlink (or forward link) refers to the communications link from the BS to the UE, and the uplink (or reverse link) refers to the communications link from the UE to the BS. As will be described in more detail, a BS may be referred to as a Node B, a gNB, an access point (AP), a radio head, a transmit receive point (TRP), a new radio (NR) BS, a 5G Node B, and/or the like.

The above multiple access technologies have been adopted in various telecommunications standards to provide a common protocol that enables different user equipment to communicate on a municipal, national, regional, and even global level. New radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation.

SUMMARY

According to an aspect of the present disclosure, a method performed by a wireless device aggregates a number of component carriers (CCs) to generate a virtual CC. The method also allocates data channel resources in the virtual CC based on a virtual bandwidth part (BWP). The method also allocates control channel resources in the virtual CC based on the virtual BWP. The method also communicates on a data channel based on the allocated data channel resources. The method further communicates on a control channel based on the allocated control channel resources.

In another aspect of the present disclosure, an apparatus for wireless communications performed by a wireless device, includes a processor and memory coupled with the processor. Instructions stored in the memory are operable, when executed by the processor, to cause the apparatus to aggregate a number of component carriers (CCs) to generate a virtual CC. The apparatus can also allocate data channel resources in the virtual CC based on a virtual bandwidth part (BWP). The apparatus can also allocate control channel resources in the virtual CC based on the virtual BWP. The apparatus can also communicate on a data channel based on the allocated data channel resources. The apparatus can further communicate on a control channel based on the allocated control channel resources.

In another aspect of the present disclosure, a wireless device for wireless communications includes means for aggregating a number of component carriers (CCs) to generate a virtual CC. The wireless device also includes means for allocating data channel resources in the virtual CC based on a virtual bandwidth part (BWP). The wireless device also includes means for allocating control channel resources in the virtual CC based on the virtual BWP. The wireless device also includes means for communicating on a data channel based on the allocated data channel resources. The wireless device further includes means for communicating on a control channel based on the allocated control channel resources.

In another aspect of the present disclosure, a non-transitory computer-readable medium with program code recorded thereon is disclosed. The program code is executed by a wireless device and includes program code to aggregate a number of component carriers (CCs) to generate a virtual CC. The wireless device also includes program code to allocate data channel resources in the virtual CC based on a virtual bandwidth part (BWP). The wireless device also includes program code to allocate control channel resources in the virtual CC based on the virtual BWP. The wireless device also includes program code to communicate on a data channel based on the allocated data channel resources. The wireless device further includes program code to communicate on a control channel based on the allocated control channel resources.

BRIEF DESCRIPTION OF THE DRAWINGS

So that features of the present disclosure can be understood in detail, a particular description, may be had by reference to aspects, some of which are illustrated in the appended drawings. It is to be noted, however, that the appended drawings illustrate only certain aspects of this disclosure and are therefore not to be considered limiting of its scope, for the description may admit to other equally effective aspects. The same reference numbers in different drawings may identify the same or similar elements.

FIG. 3 is a diagram illustrating an example of the Federal Communications Commission (FCC) limits on bandwidth and power for unlicensed use of the 6 GHz band.

FIG. 4A is a block diagram illustrating an example of a contiguous virtual component carrier (CC), in accordance with aspects of the present disclosure.

FIG. 4B is a block diagram illustrating an example of a noncontiguous virtual CC, in accordance with aspects of the present disclosure.

FIG. 4C is a block diagram illustrating an example of a noncontiguous virtual CC, in accordance with aspects of the present disclosure.

FIG. 7 is a diagram illustrating an example process performed, for example, by a wireless device, in accordance with various aspects of the present disclosure.

DETAILED DESCRIPTION

Figure 1:
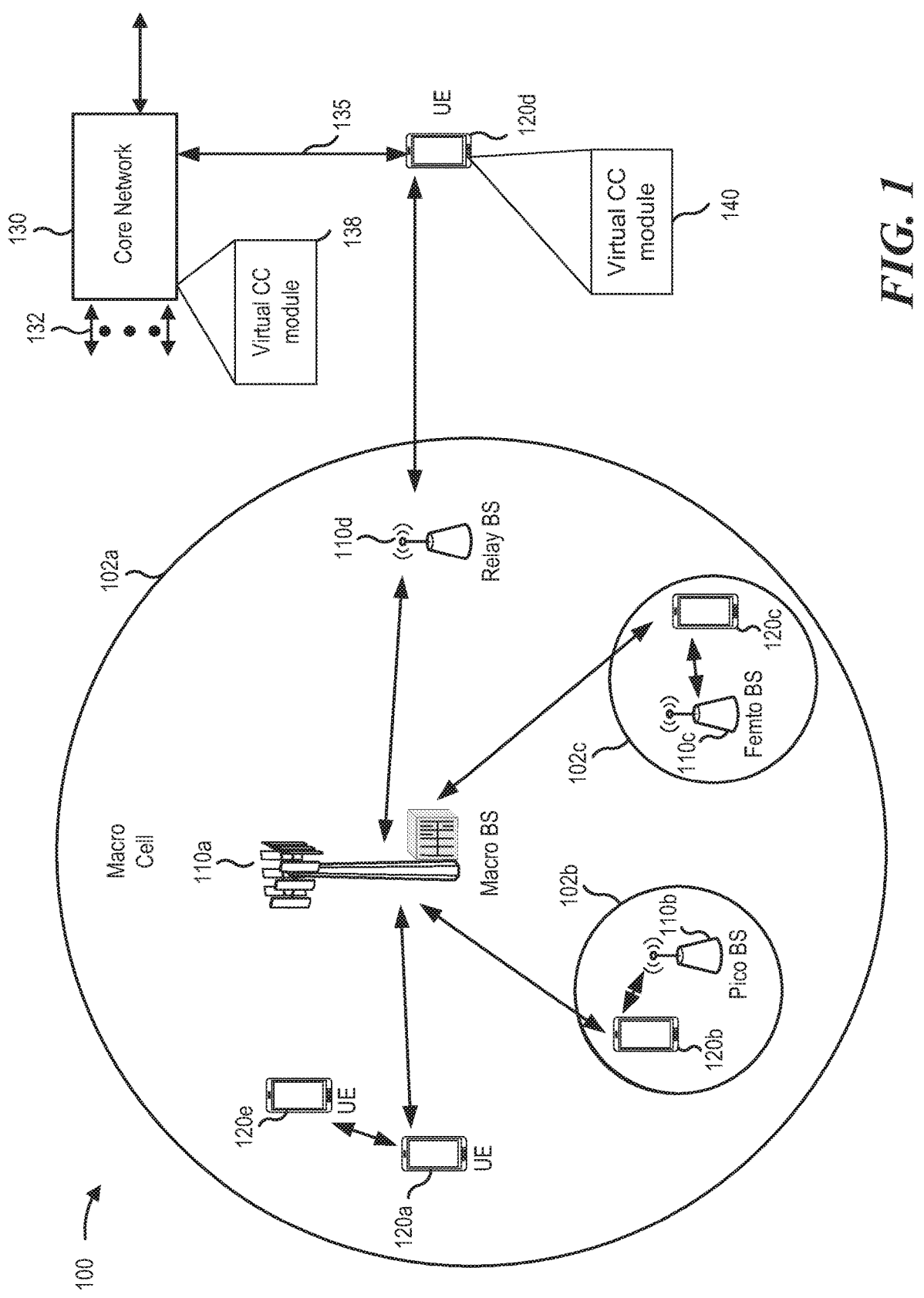
FIG. 1 is a block diagram conceptually illustrating an example of a wireless communications network, in accordance with various aspects of the present disclosure.

Various aspects of the disclosure are described more fully below with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings, one skilled in the art should appreciate that the scope of the disclosure is intended to cover any aspect of the disclosure, whether implemented independently of or combined with any other aspect of the disclosure. For example, an apparatus may be implemented or a method may be practiced using any number of the aspects set forth. In addition, the scope of the disclosure is intended to cover such an apparatus or method which is practiced using other structure, functionality, or structure and functionality in addition to or other than the various aspects of the disclosure set forth. It should be understood that any aspect of the disclosure disclosed may be embodied by one or more elements of a claim.

Several aspects of telecommunications systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements").

These elements may be implemented using hardware, software, or combinations thereof. Whether such elements are implemented as hardware or software depends upon the particular application and design constraints imposed on the overall system.

It should be noted that while aspects may be described using terminology commonly associated with 5G and later wireless technologies, aspects of the present disclosure can be applied in other generation-based communications systems, such as and including 3G and/or 4G technologies.

The new radio-unlicensed (NR-U) design for Release 16 and beyond targets the 5 GHz and 6 GHz bands. The expanded unlicensed use of the 6 GHz band is defined by Federal Communications Commission (FCC) regulations. The FCC regulations limit an amount of bandwidth and power for unlicensed use of the 6 GHz band.

Based on FCC regulations for 6 GHz, for a low power indoor (LPI) mode, the power spectral density (PSD) limitation is lower than 5 GHz, for example, 11 dB lower at a user equipment (UE) side and 5 dB lower at a base station (e.g., gNB). Therefore, the link budget may be reduced such that the uplink may be weaker. It is desirable to balance the link budget between the downlink and uplink.

To increase the transmit power, a signal may be transmitted on a wide bandwidth. For example, for the low power indoor mode, a base station and UE may transmit at 320 MHz to reach peak power. Still, for NR, under frequency range 1 (FR1), the maximum bandwidth per component carrier (CC) is 100 MHz. For NR-U, the maximum bandwidth per CC is 80 MHz. As a result, for each CC, 6 dB of power may be lost.

In some cases, carrier aggregation may support a wider bandwidth for a downlink or uplink waveform. For example, for a 320 MHz bandwidth, four 80 MHz CCs may be specified. The CCs may operate for downlink and uplink.

Aspects of the present disclosure are directed to aggregating multiple CCs to generate a virtual CC. Data channel resources and control channel resources may be allocated in the virtual CC based on a virtual bandwidth part (BWP). A device may communicate on a data channel based on the allocated data channel resources and communicate on a control channel based on the allocated control channel resources. The communications may be uplink or downlink communications.

The virtual CC may be defined at a cell level or a BWP level. The data channel resources may be allocated based on a type-0 or type-1 allocation. The control channel resources may be configured based on a radio resource control configuration. That is, the radio resource control configures the frequency domain for a control-resource set (CORESET).

FIG. 1 is a diagram illustrating a network 100 in which aspects of the present disclosure may be practiced. The network 100 may be a 5G or NR network or some other wireless network, such as an LTE network. The wireless network 100 may include a number of BSs 110 (shown as BS 110a, BS 110b, BS 110c, and BS 110d) and other network entities. A BS is an entity that communicates with user equipment (UEs) and may also be referred to as a base station, an NR BS, a Node B, a gNB, a 5G node B (NB), an access point, a transmit and receive point (TRP), and/or the like. Each BS may provide communications coverage for a particular geographic area. In 3GPP, the term "cell" can refer to a coverage area of a BS and/or a BS subsystem serving this coverage area, depending on the context in which the term is used.

A BS may provide communications coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

The wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communications between the BS 110a and UE 120d. A relay station may also be referred to as a relay BS, a relay base station, a relay, and/or the like.

The wireless network 100 may be a heterogeneous network that includes BSs of different types, e.g., macro BSs, pico BSs, femto BSs, relay BSs, and/or the like. These different types of BSs may have different transmit power levels, different coverage areas, and different impact on interference in the wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

As an example, the BSs 110 (shown as BS 110a, BS 110b, BS 110c, and BS 110d) and the core network 130 may exchange communications via backhaul links 132 (e.g., S1, etc.). Base stations 110 may communicate with one another over other backhaul links (e.g., X2, etc.) either directly or indirectly (e.g., through core network 130). The UEs 120 (e.g., 120a, 120b, 120c) may communicate with the core network 130 through a communications link 135.

The core network 130 may be an evolved packet core (EPC), which may include at least one mobility management entity (MME), at least one serving gateway (S-GW), and at least one packet data network (PDN) gateway (P-GW). The MME may be the control node that processes the signaling between the UEs 120 and the EPC. All user IP packets may be transferred through the S-GW, which itself may be connected to the P-GW. The P-GW may provide IP address allocation as well as other functions. The P-GW may be connected to the network operator's IP services. The operator's IP services may include the Internet, the Intranet, an IP multimedia subsystem (IMS), and a packet-switched (PS) streaming service.

The core network 130 may provide user authentication, access authorization, tracking, IP connectivity, and other access, routing, or mobility functions. One or more of the base stations 110 or access node controllers (ANCs) may interface with the core network 130 through backhaul links 132 (e.g., S1, S2, etc.) and may perform radio configuration and scheduling for communications with the UEs 120. In some configurations, various functions of each access network entity or base station 110 may be distributed across various network devices (e.g., radio heads and access network controllers) or consolidated into a single network device (e.g., a base station 110).

UEs 120 (e.g., 120a, 120b, 120c) may be dispersed throughout the wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communications device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

One or more UEs 120 may establish a PDU session for a network slice. In some cases, the UE 120 may select a network slice based on an application or subscription service. By having different network slices serving different applications or subscriptions, the UE 120 may improve its resource utilization in the wireless communications system 100, while also satisfying performance specifications of individual applications of the UE 120. In some cases, the network slices used by UE 120 may be served by an AMF (not shown in FIG. 1) associated with one or both of the base station 110 or core network 130. In addition, session management of the network slices may be performed by an SMF.

The AMF may include a default network slice module 138 for determining whether all default S-NSSAI are subject to NSSAA, and initiating NSSAA on all default S-NSSAIs when all default S-NSSAIs are subject to NSSAA. In FIG. 1, the default network slice module 138 is shown as a component of an AMF (not shown) associated with the core network 130.

The UEs 120 may include a virtual CC module 140. For brevity, only one UE 120d is shown as including the virtual CC module 140. The virtual CC module 140 may aggregate a number of component carriers (CCs) to generate a virtual CC: allocate data channel resources in the virtual CC based on a virtual bandwidth part (BWP); allocate control channel resources in the virtual CC based on the virtual BWP; communicate on a data channel based on the allocated data channel resources; and communicate on a control channel based on the allocated control channel resources.

The core network 130 or the base stations 110 may include a virtual CC module 138. For case of explanation, the virtual CC module 138 is shown in the core network 130. Still, the virtual CC module 138 may be a component of the base station 110. The virtual CC module 138 may aggregate a number of component carriers (CCs) to generate a virtual CC; allocate data channel resources in the virtual CC based on a virtual bandwidth part (BWP); allocate control channel resources in the virtual CC based on the virtual BWP; communicate on a data channel based on the allocated data channel resources; and communicate on a control channel based on the allocated control channel resources.

Some UEs may be considered machine-type communications (MTC) or evolved or enhanced machine-type communications (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communications link. Some UEs may be considered Internet-of-Things (IoT) devices, and/or may be implemented as NB-IoT (narrowband internet of things) devices. Some UEs may be considered a customer premises equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different Rats. In some cases, NR or 5G RAT networks may be deployed.

In some aspects, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere as being performed by the base station 110. For example, the base station 110 may configure a UE 120 via downlink control information (DCI), radio resource control (RRC) signaling, a media access control-control element (MAC-CE) or via system information (e.g., a system information block (SIB).

As indicated above, FIG. 1 is provided merely as an example. Other examples may differ from what is described with regard to FIG. 1.

Figure 2:
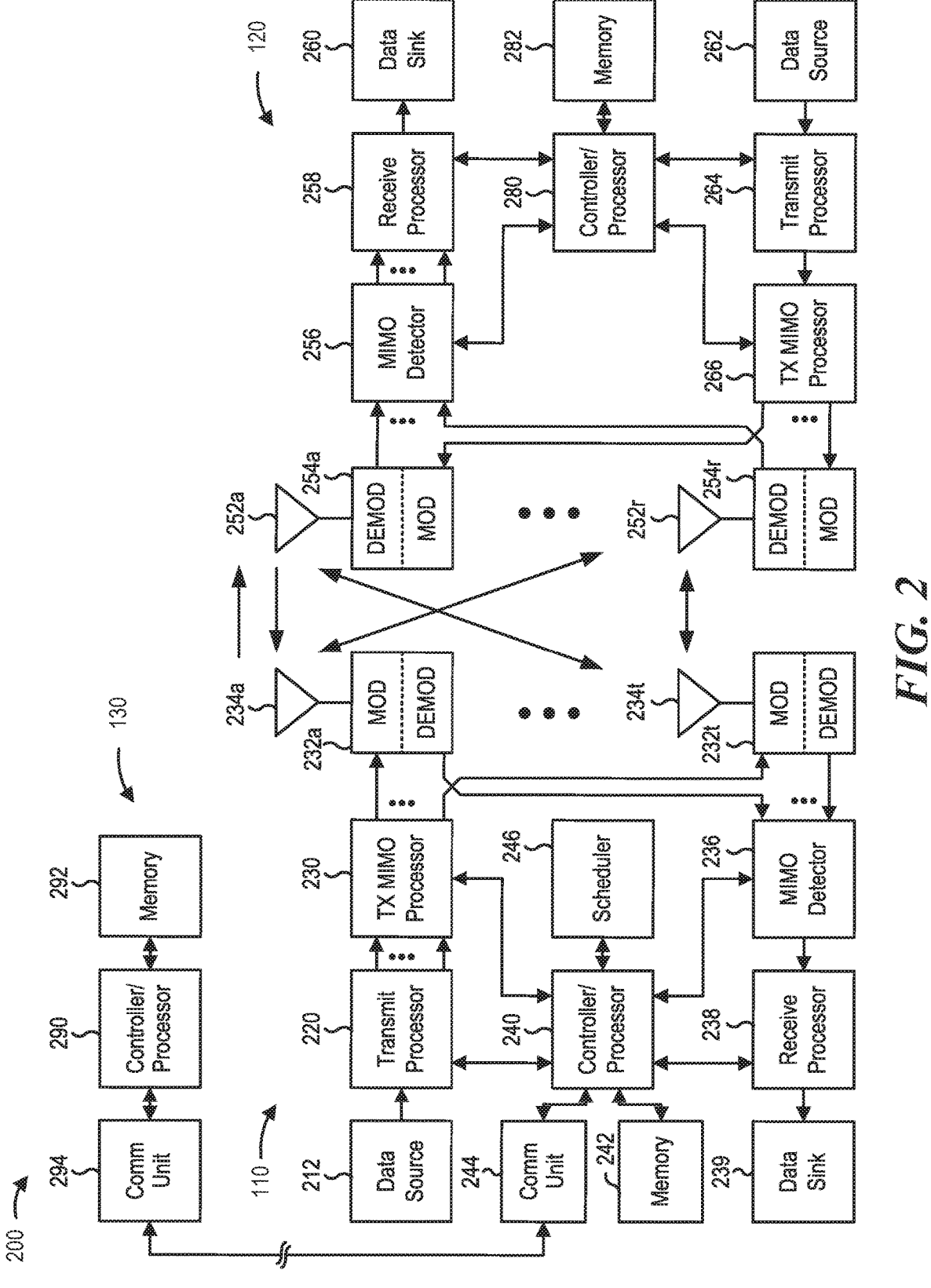
FIG. 2 is a block diagram conceptually illustrating an example of a base station in communication with a user equipment (UE) in a wireless communications network, in accordance with various aspects of the present disclosure.

FIG. 2 shows a block diagram of a design 200 of the base station 110 and UE 120, which may be one of the base stations and one of the UEs in FIG. 1. The base station 110 may be equipped with T antennas 234*a* through 234*t*, and UE 120 may be equipped with R antennas 252*a* through 252*r*, where in general T≥1 and R≥1.

At the base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Decreasing the MCS lowers throughput but increases reliability of the transmission. The transmit processor 220 may also process system information (e.g., for semi-static resource partitioning information (SRPI) and/or the like) and control information (e.g., CQI requests, grants, upper layer signaling, and/or the like) and provide overhead symbols and control symbols. The transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232*a* through 232*t*. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232*a* through 232*t* may be transmitted via T antennas 234*a* through 234*t*, respectively. According to various aspects described in more detail below, the synchronization signals can be generated with location encoding to convey additional information.

At the UE 120, antennas 252*a* through 252*r* may receive the downlink signals from the base station 110 and/or other base stations and may provide received signals to demodulators (DEMODs) 254*a* through 254*r*, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254*a* through 254*r*, perform MIMO detection on the received symbols if applicable, and provide detected symbols. A receive processor 258 may process (e.g., demodulate and decode) the detected symbols, provide decoded data for the UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of the UE 120 may be included in a housing.

On the uplink, at the UE 120, a transmit processor 264 may receive and process data from a data source 262 and control information (e.g., for reports comprising RSRP, RSSI, RSRQ, CQI, and/or the like) from the controller/processor 280. Transmit processor 264 may also generate reference symbols for one or more reference signals. The symbols from the transmit processor 264 may be precoded by a TX MIMO processor 266 if applicable, further processed by modulators 254*a* through 254*r* (e.g., for DFT-s-OFDM, CP-OFDM, and/or the like), and transmitted to the base station 110. At the base station 110, the uplink signals from the UE 120 and other UEs may be received by the antennas 234, processed by the demodulators 254, detected by a MIMO detector 236 if applicable, and further processed by a receive processor 238 to obtain decoded data and control information sent by the UE 120. The receive processor 238 may provide the decoded data to a data sink 239 and the decoded control information to a controller/processor 240. The base station 110 may include communications unit 244 and communicate to the network controller 130 via the communications unit 244. The network controller 130 may include a communications unit 294, a controller/processor 290, and a memory 292.

The controller/processor 240 of the base station 110, the controller/processor 280 of the UE 120, and/or any other component(s) of FIG. 2 may perform one or more techniques associated with aggregating CCs as described in more detail elsewhere. For example, the controller/processor 240 of the base station 110, the controller/processor 280 of the UE 120, and/or any other component(s) of FIG. 2 may perform or direct operations of, for example, the process of FIG. 9 and/or other processes as described. Memories 242 and 282 may store data and program codes for the base station 110 and UE 120, respectively. A scheduler 246 may schedule UEs for data transmission on the downlink and/or uplink.

In some aspects, the UE 120 may include means for aggregating a number of component carriers (CCs) to generate a virtual CC; means for allocating data channel resources in the virtual CC based on a virtual bandwidth part (BWP); means for allocating control channel resources in the virtual CC based on the virtual BWP; means for communicating on a data channel based on the allocated data channel resources; and means for communicating on a control channel based on the allocated control channel resources. Such means may include one or more components of the UE 120 or base station 110 described in connection with FIG. 2.

As indicated above, FIG. 2 is provided merely as an example. Other examples may differ from what is described with regard to FIG. 2.

The new radio-unlicensed (NR-U) designs for Release 16 and beyond target the 5 GHz and 6 GHz bands. The expanded unlicensed use of the 6 GHz band is defined by Federal Communications Commission (FCC) regulations. The FCC regulations limit an amount of bandwidth and power for unlicensed use of the 6 GHz band.

FIG. 3 is a diagram illustrating an example of the FCC limits on bandwidth and power for unlicensed use of the 6 GHz band. As shown in FIG. 3, three different modes (e.g., classes) may be defined, standard-power (SP) mode, low-power mode, and very low power mode. Devices may be assigned to one of the three modes. The SP modes may be divided into an access point and a client (e.g., a user equipment (UE)) connected to the access point. The low-power mode may be divided into an access point and a client connected to the access point. An operating band, maximum equivalent isotropic radiated power (EIRP), and a maximum EIRP power spectral density (PSD) may be defined for each type of device.

For the SP mode, an automated frequency coordination (AFC) system provides, for each frequency, the maximum EIRP and PSD to a base station (e.g., gNB), such as the base station 110 of FIG. 1. As shown in FIG. 3, in the SP mode, for both the EIRP and PSD, the UE transmit (TX) power is less than the maximum allowed base station transmit power. Additionally, as described, the UE, such as the UE 120 of FIG. 1, connects to the standard-power access point.

For the low-power mode, the base station may use a low power indoor (LPI) mode without communication with the AFC system. As shown in FIG. 3, for the low-power mode, for both the EIRP and PSD, the UE transmit power is less than the maximum allowed base station transmit power. In the low-power mode, the base station and associated UEs employ a contention-based protocol.

For the very low-power (VLP) mode, whether indoor or outdoor, a device can operate across the entirety of the 6 GHz band without using the AFC system. In the VLP mode, the device transmit power is limited both in PSD and EIRP.

For 6 GHz operations, the PSD limitation is lower in comparison to limitations specified for 5 GHz operations. For example, for the low power indoor mode, the UE power may be reduced by 11 dB and the base station (e.g., gNB) power may be reduced by 5 dB. Therefore, the link budget may be reduced such that the uplink may be weaker. It is desirable to balance the link budget between the downlink and uplink.

To increase the transmit power, a signal may be transmitted on a wide bandwidth, occupying the entire spectrum of the bandwidth. For example, for the low power indoor mode, a base station and UE may transmit at 320 MHz to reach the peak power. Still, for NR, under frequency range 1 (FR1), the maximum bandwidth per component carrier (CC) is 100 MHz. For NR-U, the maximum bandwidth per CC is 80 MHz. As a result, for each CC, 6 dB of power may be lost.

In some cases, carrier aggregation may support a wider bandwidth for a downlink or uplink waveform. For example, for a 320 MHz bandwidth, four 80 MHz CCs may be specified. The CCs may operate for downlink and uplink.

In conventional carrier aggregation systems, control signals and data communications are independently transmitted on each CC. Aspects of the present disclosure are directed to aggregating multiple CCs to generate a virtual CC, and frequency domain resources are allocated for the control channel and data channel within the virtual CC. That is, each configured CC in the 6 GHz band may be an aggregated CC. The aggregated CC may be referred to as a virtual CC. Data channel resources and control channel resources may be allocated in the virtual CC based on a virtual bandwidth part (BWP). A device may communicate on a data channel based on the allocated data channel resources and communicate on a control channel based on the allocated control channel resources. The communications may be uplink or downlink communications.

As described, the virtual CC is generated by aggregating multiple CCs. In one configuration, the virtual CC includes all physical resource blocks (PRBs) for each CC of the multiple CCs used to generate the virtual CC. The PRBs may be contiguous or noncontiguous. FIG. 4A illustrates an example of a contiguous virtual CC 400, in accordance with aspects of the present disclosure. As shown in FIG. 4A, four CCs (shown as CC0-CC3) are aggregated to form the contiguous virtual CC 400.

FIG. 4B illustrates an example of a noncontiguous virtual CC 410, in accordance with aspects of the present disclosure. As shown in FIG. 4B, four CCs (shown as CC0-CC3) are aggregated to form the noncontiguous virtual CC 410. In this example, guard bands 412 are defined between each CC.

FIG. 4C illustrates an example of a noncontiguous virtual CC 420, in accordance with aspects of the present disclosure. As shown in FIG. 4C, four CCs (shown as CC0-CC3) are aggregated to form the noncontiguous virtual CC 420. In this example, a CC between the first CC (CC0) and the second CC (CC1) is skipped. As an example, the CC may be skipped because the resources may be unavailable. Additionally, guard bands 412 are defined between each CC.

In one implementation, the PRBs included in the virtual CC are on a same RB grid. If a guard band, such as guard bands 412 described for FIGS. 4B and 4C, is defined between CCs, the guard bands are on the RB level grid.

In one configuration, the bandwidth of the virtual CC is equal to or less than 320 MHz. Transmitting devices and receiving devices may implement the virtual CC with a carrier aggregation (CA) structure. Therefore, separate downlink control (DC) indications may be supported. In some cases, more than one downlink control indication may be specified. In one example, up to four downlink control indications may be specified if each CC performs a separate inverse fast Fourier transform (IFFT).

According to an aspect of the present disclosure, the virtual CC is defined at a cell level. In this aspect, the virtual CC is defined by a list of CCs. The virtual BWP may be defined within the virtual CC.

Figures 5A, 5B:
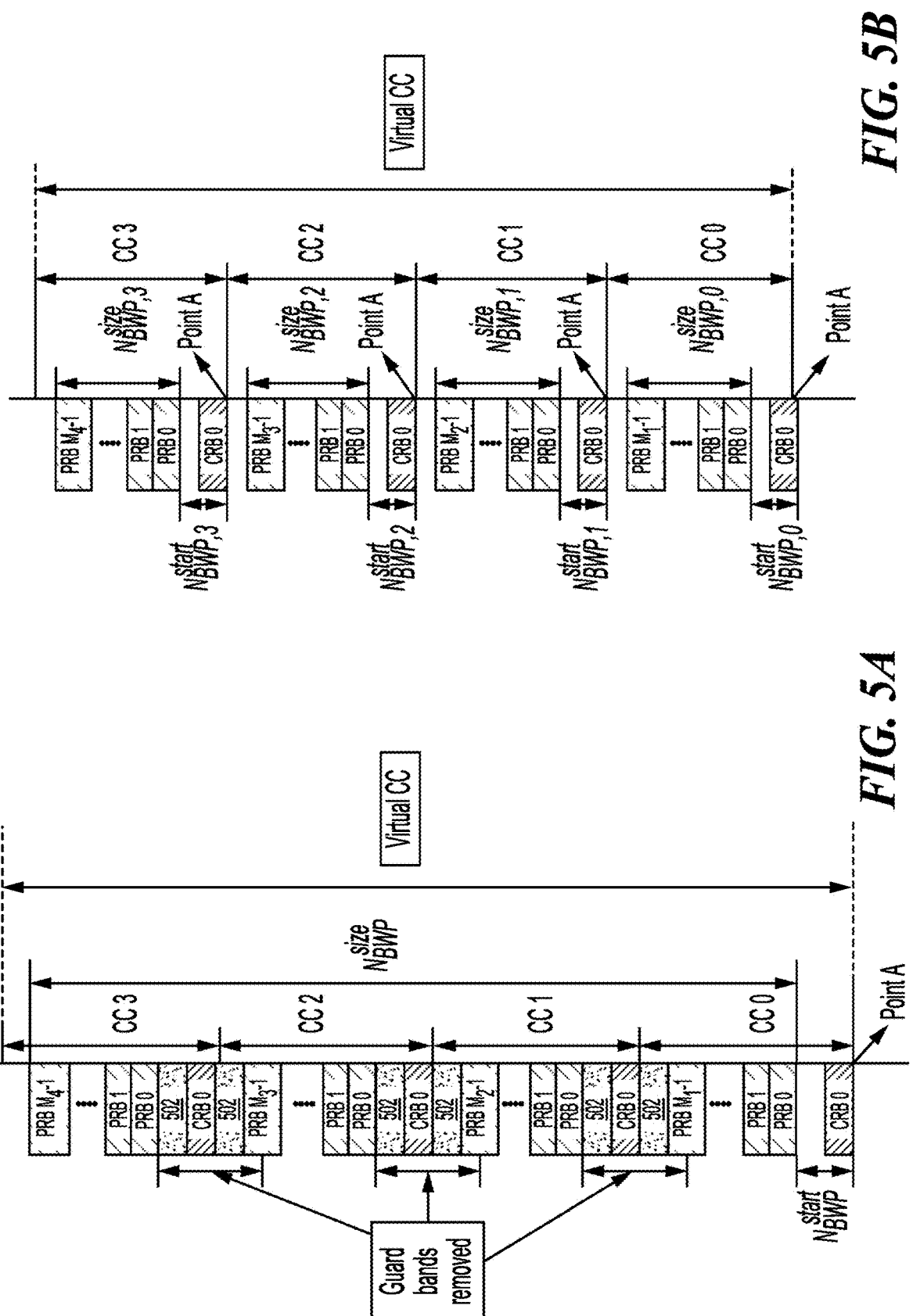
FIG. 5A is a block diagram illustrating an example of defining the virtual bandwidth part (BWP) by a resource allocation area within the virtual CC, in accordance with aspects of the present disclosure.
FIG. 5B is a block diagram illustrating an example of defining the virtual BWP multiple resource allocation areas within the virtual CC, in accordance with aspects of the present disclosure.

In one implementation, the virtual BWP is defined by a resource allocation area within the virtual CC. The resource allocation area identifies a starting resource block and a number of resource blocks (e.g., length of the resource blocks) for the virtual BWP. FIG. 5A illustrates an example of the virtual BWP defined by a resource allocation area within the virtual CC, in accordance with aspects of the present disclosure. In the example of FIG. 5A, the guard bands (e.g., guard resource blocks) adjacent to the common reference blocks (CRB) are removed. Each CC (shown as CC 0-CC 3) includes a number of resource blocks (shown as PRBs). In some implementations, the CCs may be contiguous without a guard band defined between adjacent CCs, or the number of resource blocks for the virtual BWP is limited to resource blocks within each CC of the virtual CC. Additionally, as shown in FIG. 5A, the virtual BWP is defined by a starting resource block (shown as $$N_{BWP}^{start})$$

and a number of resource blocks (shown as $$N_{BWP}^{size}).$$

In another implementation, a virtual BWP is defined by multiple resource allocation areas within the virtual CC. FIG. 5B illustrates an example of defining the virtual BWP multiple resource allocation areas within the virtual CC, in accordance with apects of the present disclosure. As described, each resource allocation area identifies a starting resource block and a number of resource blocks for the virtual BWP. As shown in FIG. 5B, each CC (shown as CC 0-CC 3) corresponds to a different common reference point (shown as Point A) for a resource block grid. The starting resource block (shown as $$N_{BWP,0}^{start} - N_{BWP,3}^{start})$$

for each resource allocation area corresponds to a different reference point. Additionally, the number of resource blocks (shown as $$N_{BWP,0}^{start} - N_{BWP,3}^{start})$$

for a given resource allocation area is based on the number of resource blocks (shown as PRB) for each CC. In the example of FIG. 5B, the guard bands may be skipped, or the CCs are contiguous.

Figure 5C:
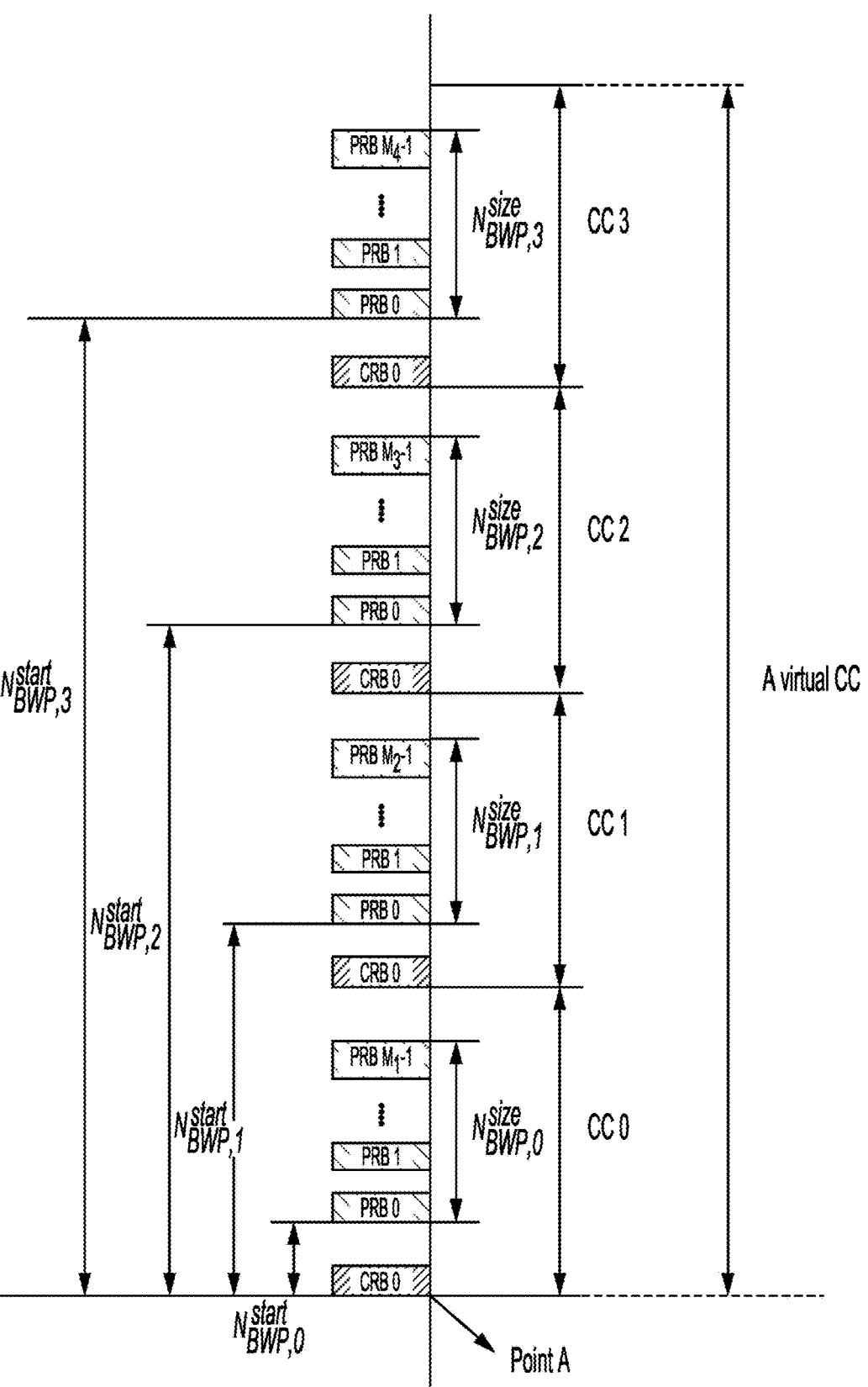
FIG. 5C is a block diagram illustrating an example of defining the virtual BWP multiple resource allocation areas within the virtual CC, where CCs in the virtual CC share a common reference point for resource block grids, in accordance with aspects of the present disclosure.

Alternatively, all CCs in a virtual CC share a common reference point for resource block grids. FIG. 5C illustrates an example of defining the virtual BWP multiple resource allocation areas within the virtual CC, where CCs in the virtual CC share a common reference point for resource block grids, in accordance with aspects of the present disclosure. As shown in FIG. 5C, each CC (shown as CC 0-CC 3) shares a common reference point (shown as Point A) for a resource block grid. The starting resource block (shown as $$N_{BWP,0}^{start} - N_{BWP,3}^{start})$$

for each resource allocation area is initiated at a common reference point. Additionally, the number of resource blocks (shown as $$N_{BWP,0}^{start} - N_{BWP,3}^{start})$$

for a given resource allocation area is based on the number of resource blocks (shown as PRB) for each CC. In the example of FIG. 5C, the guard bands may be skipped, or the CCs are contiguous According to another aspect of the present disclosure, a virtual CC is defined at a BWP level. In this aspect, the virtual CC may be considered a virtual BWP. In one implementation, a BWP is defined per CC. A virtual BWP may be a concatenation of the BWP defined per CC. In another implementation, the virtual BWP is defined over all CCs. In this implementation, the virtual BWP is defined by multiple resource allocation areas within the virtual CC. As described, each resource allocation area identifies a starting resource block and a number of resource blocks for the virtual BWP.

Frequency resources of the virtual CC may be allocated for a data channel. In one implementation, frequency resources are allocated for a data channel type-0 bitmap-based allocation scheme.

In one configuration, a size of the bitmap is increased by concatenating bitmaps of all CCs of the virtual CC. In this configuration, the resource block group (RBG) size may remain the same. A size of the bitmap is a product of a size of a resource block group ($N_{RBG}$) and the number of configured CCs. That is, the bitmap is a concatenation of the bitmaps defined for all CCs in the virtual CC.

Figures 6A, 6B:
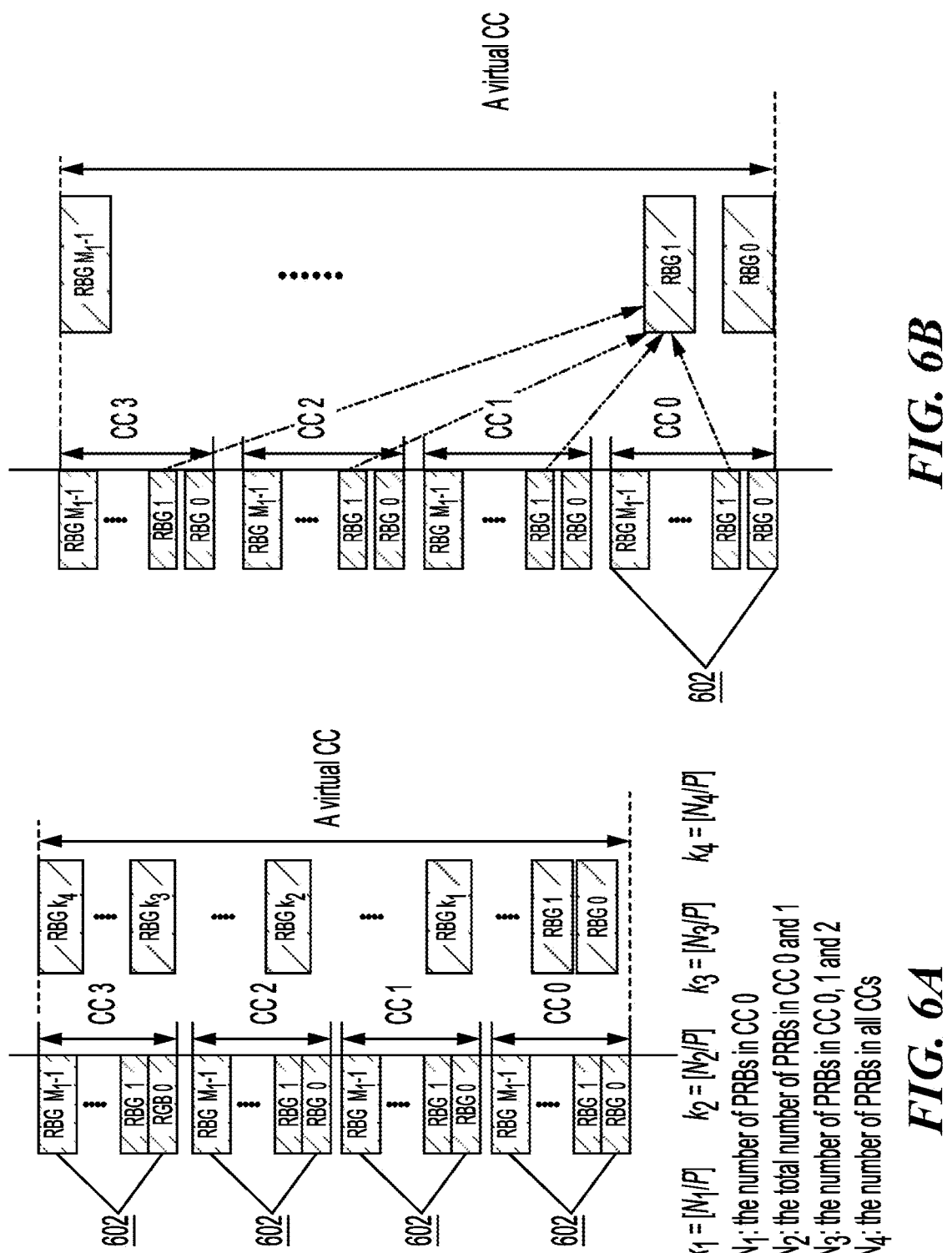
FIG. 6A is a block diagram illustrating an example of renumbering resource block groups (RBGs) in ascending order, in accordance with aspects of the present disclosure.
FIG. 6B is a block diagram illustrating an example of bundling resource block groups, in accordance with aspects of the present disclosure.

In another configuration, a resource block group size is increased. The resource block groups for the virtual BWP may be renumbered in ascending order. FIG. 6A illustrates an example of renumbering RBGs in ascending order, in accordance with aspects of the present disclosure. As shown in FIG. 6A, each CC (shown as CC 0-CC 3) includes a set of original resource block groups 602 with an original numbering scheme (RBG 0-RBG $M_1$-1). In the example of FIG. 6A, the resource block groups may be renumbered in ascending order, such that a last resource block group is RBG 0 and an initial resource block group is RBG $k_4$. As shown in FIG. 6A, the number for each resource block group may be based on a number of PRBs in a given CC and a nominal resource block group size P value. For example, as shown in FIG. 6A, a value for RBG K; is a quotient of Ni and P, where Na is the number of PRBs in CC 0. In this configuration, the guard band between CCs is ignored, such that the BWP size is the size of the virtual BWP. A nominal resource block group size P may be determined based on TABLE 1.

TABLE 1

| Bandwidth Part Size | Configuration 1 | Configuration 2 |
|---|---|---|
| 1-36 | 2 | 4 |
| 37-72 | 4 | 8 |
| 73-144 | 8 | 16 |
| 145-278 | 16 | 16 |
| 276-550 | 32 | 32 |
| 551-1100 | 64 | 64 |

Alternatively, the nominal resource block group size P may be determined based on a product of a value from the nominal resource block group size P table defined in the 3GPP Standard 38.214 and the number of CC's in the virtual CC.

According to another aspect of the present disclosure, the resource block groups of each CC are bundled. That is, resource block groups with the same index may be bundled together. FIG. 6B illustrates an example of bundling resource block groups, in accordance with aspects of the present disclosure. As shown in FIG. 6B, resource block groups with the same index, such as RBG 1, are bundled together. The size of the bundled resource block groups may be larger than a size of a resource block in the set of original resource block groups 602. In the example of FIG. 6B, one bit in the bitmap assigns one resource block group per component BWP in the virtual BWP. Furthermore, in the example of FIG. 6B, each CC has the same number of resource block groups in the set of original resource block groups 602.

According to another aspect of the present disclosure, data channel resources are allocated according to a type-1 resource indicator value (RIV). In one implementation, the PRBs from a virtual BWP are renumbered in ascending order, and the unused PRBs in the guard bands are excluded from the renumbering. In another implementation, the PRBs from a virtual BWP are renumbered in ascending order, and a length of contiguously allocated resource blocks LRBS includes unused PRBs (e.g., PRBs in a guard band). Still, the wireless device (e.g., user equipment (UE)) may skip the unused PRB because the unused PRBs are guard bands. In this implementation, a maximum length of contiguously allocated resource blocks LRBS equals a total number of PRBs in configured CCs in the 6 GHz band.

According to another aspect of the present disclosure, the resource block group can be introduced into the type-1 resource indicator value. In one implementation, the resource block group equals the number of CCs configured in the virtual CC. In this implementation, the basic resource elements of the virtual CC may be resource block groups instead of PRBs. In this implementation, when numbering the PRBs from the virtual BWP in ascending order, the guard band between the CCs will be ignored. Additionally, in this implementation, the PRBs of each CC may be bundled to a REG based on an index of the PRB (see for example, FIG. 6B). Accordingly, each CC should have a same number of PRBs to facilitate the bundling.

In another implementation, the RIV is set for one component BWP (e.g., the BWP for one CC of the CCs in the virtual CC). In this implementation, the resource allocation for the one component BWP is repeated to the other component BWP in the virtual BWP.

As described, aspects of the present disclosure also allocate frequency domain resources in the virtual CC for the control channel. In one implementation, frequency domain resources are allocated for a control resource set (CORESET) based on a radio resource control (RRC) configuration.

In one implementation, the frequency domain resources are allocated for the control channel based on a bitmap. In one configuration, the size of the bitmap is greater than 45-bits and each bit allocates frequency domain resources for a number of resource blocks in the virtual CC. The number of resource blocks may be six.

In another configuration, the frequency domain resources are allocated to the CORESET of one CC (e.g., a first CC) in the virtual CC. In this configuration, the bitmap (e.g., first bitmap) is a 45-bit bitmap and each bit allocates frequency domain resources for a number of resource blocks in the virtual CC. The number of resource blocks may be six. Additionally, in this configuration, the frequency domain resources configured for the CORESET of the first CC may be mirrored to other CCs in the virtual CC. Another bitmap (e.g., second bitmap) controls the mirroring. For example, the second bitmap identifies particular CC's of the other CCs that should receive the CORESET resource allocation of the first CC. A length of the second bitmap may be based on a number of CCs in the virtual CC. The CORESET may be applied over all REG clusters and a single search space may be hashed over all clusters of the CORESET.

In another implementation, the bitmap (e.g., first bitmap) is a 45-bit bitmap and each bit allocates frequency domain resources for a number of resource blocks based on a number of CCs in the virtual CC. For example, the number may be a multiple of six. In one example, the number is a product of six and the number of CCs in the virtual CC (e.g., 6C, where C is the number of CCs in the virtual CC). In this implementation, a size of an aggregation level may be larger than 16. For example, the aggregation level may be 32, 64, 128, or 256.

As indicated above, FIGS. 3, 4, 5A, 5B, 5C, 6A, and 6B are provided as examples. Other examples may differ from what is described with respect to FIGS. 3, 4, 5A, 5B, 5C, 6A, and 6B.

FIG. 7 is a diagram illustrating an example process 700 performed, for example, by a wireless device, in accordance with various aspects of the present disclosure. The example process 700 is an example of a new radio-unlicensed (NR-U) virtual component carrier (CC) for improved link budget.

As shown in FIG. 7, in some aspects, the process 700 may include aggregating a number of component carriers (CCs) to generate a virtual CC (block 702). For example, the UE (e.g., using the antenna 252a, antenna 252r, DEMOD/MOD 254a, DEMOD/MOD 254r, MIMO detector 256, TX MIMO processor 266, receive processor 258, transmit processor 264, controller processor 280, and/or memory 282) can aggregate a number of component carriers.

As shown in FIG. 7, in some aspects, the process 700 may include allocating data channel resources in the virtual CC based on a virtual bandwidth part (BWP) (block 704). For example, the UE (e.g., antenna 252r, DEMOD/MOD 254r, TX MIMO processor 266, transmit processor 264, controller/processor 280, and/or memory 282) can allocate data channel resources.

As shown in FIG. 7, in some aspects, the process 700 may include allocating control channel resources in the virtual CC based on the virtual BWP (block 706). For example, the UE (e.g., antenna 252r, DEMOD/MOD 254r, TX MIMO processor 266, transmit processor 264, controller/processor 280, and/or memory 282) can allocate control channel resources. The process 700 may also include communicating on a data channel based on the allocated data channel resources (block 708). For example, the UE (e.g., using the antenna 252a, antenna 252r, DEMOD/MOD 254a, DEMOD/MOD 254r, MIMO detector 256, TX MIMO processor 266, receive processor 258, transmit processor 264, controller processor 280, and/or memory 282) can communicate on a data channel.

As shown in FIG. 7, in some aspects, the process 700 may include communicating on a control channel based on the allocated control channel resources (block 710). For example, the UE (e.g., using the antenna 252a, antenna 252r, DEMOD/MOD 254a, DEMOD/MOD 254r, MIMO detector 256, TX MIMO processor 266, receive processor 258, transmit processor 264, controller processor 280, and/or memory 282) can communicate on a control channel.

According to aspects of the present disclosure, the process 700 may be performed by one or more components of a base station, such as the base station 110 of FIG. 1.

The foregoing disclosure provides illustration and description, but is not intended to be exhaustive or to limit the aspects to the precise form disclosed. Modifications and variations may be made in light of the above disclosure or may be acquired from practice of the aspects.

As used, the term "component" is intended to be broadly construed as hardware, firmware, and/or a combination of hardware and software. As used, a processor is implemented in hardware, firmware, and/or a combination of hardware and software.

Some aspects are described in connection with thresholds. As used, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described may be implemented in different forms of hardware, firmware, and/or a combination of hardware and software. The actual specialized control hardware or software code used to implement these systems and/or methods is not limiting of the aspects. Thus, the operation and behavior of the systems and/or methods were described without reference to specific software code—it being understood that software and hardware can be designed to implement the systems and/or methods based, at least in part, on the description.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used should be construed as critical or essential unless explicitly described as such. Also, as used, the articles "a" and "an" are intended to include one or more items, and may be used interchangeably with "one or more." Furthermore, as used, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used, the terms "has," "have," "having," and/or the like are intended to be open-ended terms. Further, the phrase "based on" is intended to mean "based, at least in part, on" unless explicitly stated otherwise.

What is claimed is:

1. A method for wireless communication performed by a wireless device, comprising:
   aggregating a plurality of component carriers (CCs) to generate a virtual CC, the virtual CC representing a unified CC comprising a respective physical resource block (PRB) of each CC of the plurality of CCs;
   allocating data channel resources to one or more first resource allocation areas of a plurality of resource allocation areas of a virtual bandwidth part (BWP) defined within the virtual CC, each resource allocation area of the plurality of resource allocation areas being defined by a starting PRB and a number of contiguous PRBs;
   allocating control channel resources to one or more second resource allocation areas of the plurality of resource allocation areas of the virtual BWP;
   communicating on a data channel based on the allocated data channel resources; and
   communicating on a control channel based on the allocated control channel resources.

2. The method of claim 1, further comprising defining the virtual CC at a cell level by a list of CCs.

3. The method of claim 1, in which the plurality of CCs share a single common reference point or each CC of the plurality of CCs includes a common reference point.

4. The method of claim 1, further comprising defining the virtual CC at a BWP level.

5. The method of claim 1, in which:
   the PRBs of the plurality of CCs are contiguous or noncontiguous; and
   a guard band defined between adjacent CCs of the plurality of CCs comprises a resource block level grid when the PRBs are noncontiguous.

6. The method of claim 1, in which the PRBs of the plurality of CCs are defined on a same resource block grid.

7. The method of claim 1, further comprising allocating the data channel resources according to a type-0 bitmap-based allocation scheme.

8. The method of claim 1, further comprising allocating the data channel resources according to a type-1 resource indicator value (RIV).

9. An apparatus for wireless communications performed by a wireless device, comprising:
   at least one processor,
   at least one memory coupled with the processor; and
   instructions stored in the at least one memory and operable, when executed by the at least one processor, to cause the apparatus:
      to aggregate a plurality of component carriers (CCs) to generate a virtual CC, the virtual CC representing a unified CC comprising a respective physical resource block (PRB) of each CC of the plurality of CCs;
      to allocate data channel resources to one or more first resource allocation areas of a plurality of resource allocation areas of a virtual bandwidth part (BWP) defined within the virtual CC, each resource allocation area of the plurality of resource allocation areas being defined by a starting PRB and a number of contiguous PRBs;

to allocate control channel resources to one or more second resource allocation areas of the plurality of resource allocation areas of the virtual BWP; and to communicate on a control channel based on the allocated control channel resources.

10. The apparatus of claim 9, in which the processor causes the apparatus to define the virtual CC at a cell level by a list of CCs.

11. The apparatus of claim 10, in which the plurality of CCs share a single common reference point or each CC of the plurality of CCs includes a common reference point.

12. The apparatus of claim 9, in which the processor causes the apparatus to define the virtual CC at a BWP level.

13. The apparatus of claim 12, in which the processor causes the apparatus:

to define a BWP per CC of the plurality of CCs; and to define the virtual BWP as a concatenation of the BWP defined per CC.

14. The apparatus of claim 9, in which:

the PRBs of the plurality of CCs are contiguous or noncontiguous; and a guard band defined between adjacent CCs of the plurality of CCs comprises a resource block level grid when the PRBs are noncontiguous.

15. The apparatus of claim 9, in which the PRBs of the plurality of CCs are defined on a same resource block grid.

16. The apparatus of claim 9, in which the processor causes the apparatus to allocate the data channel resources according to a type-0 bitmap-based allocation scheme.

17. The apparatus of claim 16, in which the processor causes the apparatus to concatenate allocation bitmaps of each CC of the plurality of CCs to generate a data channel allocation bitmap for the virtual CC.

18. The apparatus of claim 16, in which the processor causes the apparatus:

to increase a size of each resource block group (RBG);

to renumber RBGs from the virtual BWP in ascending order;

to determine a nominal RBG size based on a received configuration or the received configuration and a number of CCs, in which the RBG comprises physical resource blocks from one or more CCs.

19. The apparatus of claim 16, in which the processor causes the apparatus to bundle resource block groups (RBGs) of the plurality of CCs based on an RBG index number, in which each CC in the plurality of CCs has a same number of RBGs.

20. The apparatus of claim 19, in which a bit in a data channel allocation bitmap assigns one RBG per component BWP in the virtual BWP.

21. The apparatus of claim 9, in which the processor causes the apparatus to allocate the data channel resources according to a type-1 resource indicator value (RIV).

22. The apparatus of claim 21, in which the processor causes the apparatus to renumber physical resource blocks (PRBs) of the virtual BWP in ascending order.

23. The apparatus of claim 22, in which the processor causes the apparatus to exclude PRBs in a guard band from the renumbered PRBs.

24. The apparatus of claim 22, in which a length of a contiguously allocated resource block is based on used PRBs and unused PRBs of the virtual BWP.

25. The apparatus of claim 21, in which the processor causes the apparatus:

to generate an RBG based a number of CCs in the plurality of CCs; and to allocate the data channel resources to the RBG.

26. The apparatus of claim 21, in which:

the RIV allocates the data channel resources for one BWP, in which the processor causes the apparatus to repeat the allocation for the one BWP to other BWPs in the virtual BWP; and each CC in the plurality of CCs has a same number of physical resource blocks.

27. The apparatus of claim 9, in which the processor causes the apparatus to allocate the control channel resource and allocate frequency domain resources for a control resource set (CORESET) based on a radio resource control (RRC) configuration.

28. The apparatus of claim 27, in which the processor causes the apparatus to allocate the frequency domain resource based on a first bitmap.

29. The apparatus of claim 9, in which the wireless device is a user equipment or a base station.

* * * * *